(12) United States Patent
Chung et al.

(10) Patent No.: US 7,009,479 B1
(45) Date of Patent: Mar. 7, 2006

(54) STEERING COLUMN LOCK FOR PERSONAL IDENTIFICATION CARD SYSTEM

(75) Inventors: Jin-Sang Chung, Suwon-si (KR); Sung-Ook Choi, Asan-si (KR)

(73) Assignee: Hyundai Motor Company, Seoul (KR)

( * ) Notice: Subject to any disclaimer, the term of this patent is extended or adjusted under 35 U.S.C. 154(b) by 92 days.

(21) Appl. No.: 11/024,866

(22) Filed: Dec. 28, 2004

(30) Foreign Application Priority Data

Oct. 1, 2004 (KR) ............... 10-2004-0078386

(51) Int. Cl.
*B60R 25/02* (2006.01)
*H01F 7/08* (2006.01)

(52) U.S. Cl. ............... 335/234; 335/229; 70/252

(58) Field of Classification Search ........ 335/229–234, 335/255, 274; 70/252
See application file for complete search history.

(56) References Cited

U.S. PATENT DOCUMENTS 6,516,640 B1 * 2/2003 Jacobs et al. ............... 70/186
2003/0231100 A1 * 12/2003 Chung ....................... 340/5.2

* cited by examiner

*Primary Examiner*—Ramon M. Barrera
(74) *Attorney, Agent, or Firm*—Morgan Lewis & Bockius LLP

(57) ABSTRACT

The compact steering column lock for a personal identification card system is provided to stably execute a conversion function of engaging or disengaging the maneuverability of a knob and a key interlock function and the like by receiving a control signal from a controller and a knob manipulation force from the user. The steering column lock for a personal identification card system comprises a bi-directional solenoid actuator, a lever, an actuating plate, a permanent magnet, a coil spring, and a cam shaft having a pivot axis, which is perpendicular to said pivot axis of said lever, the cam shaft including a cam whose pivot state is converted according to a pivot state of the blocking part of said lever.

6 Claims, 9 Drawing Sheets

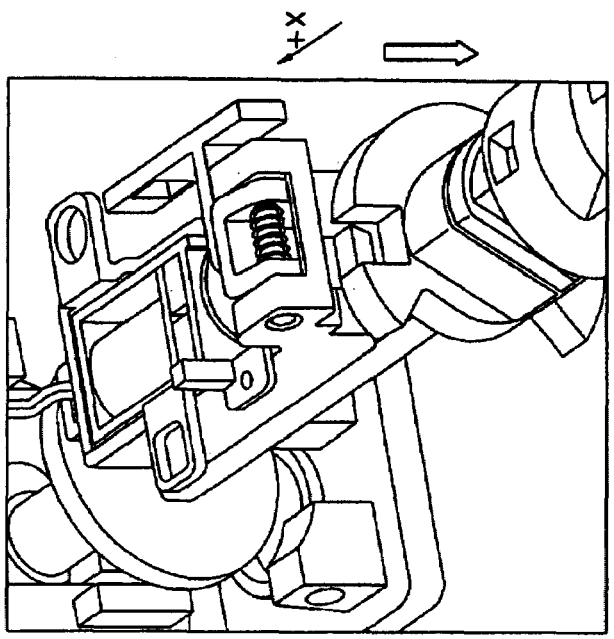
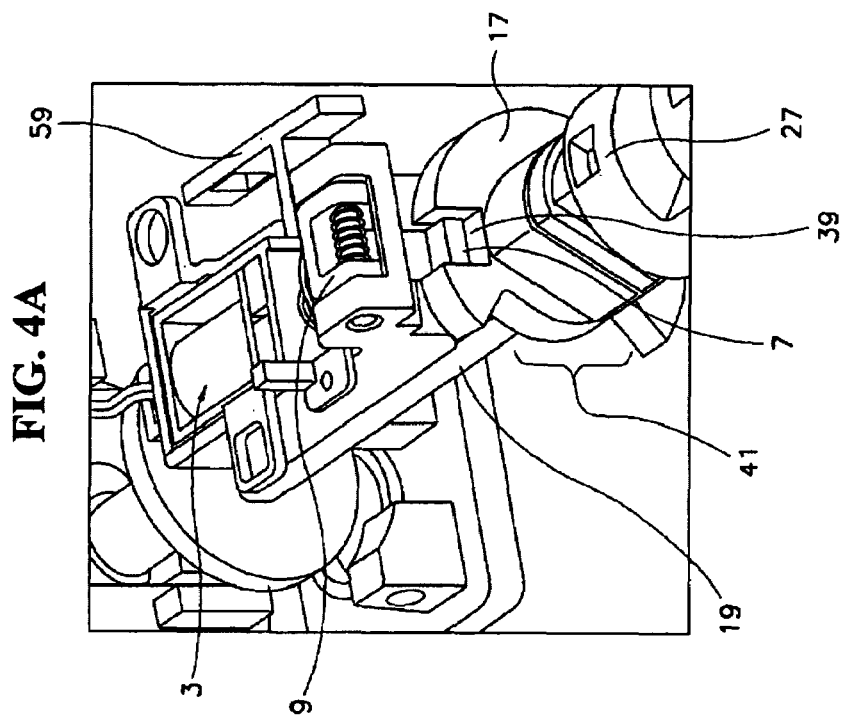

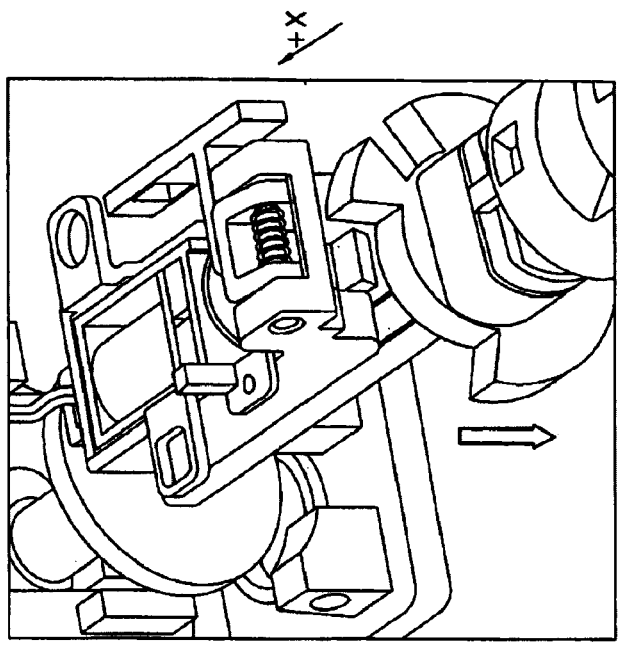
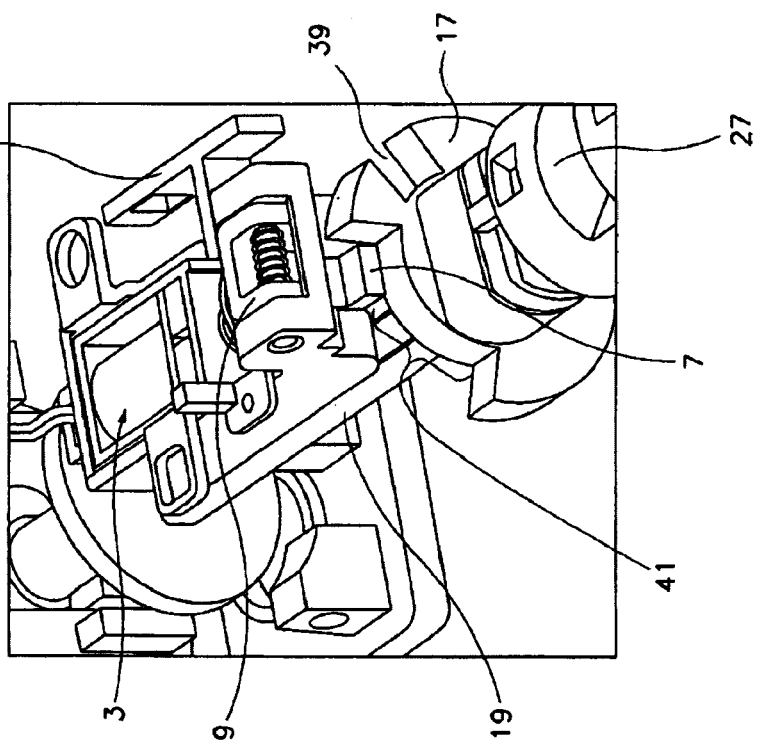

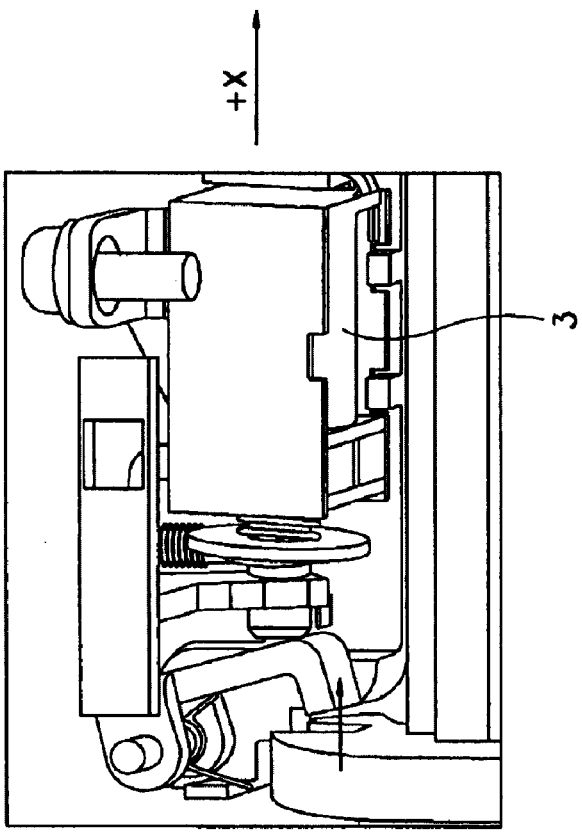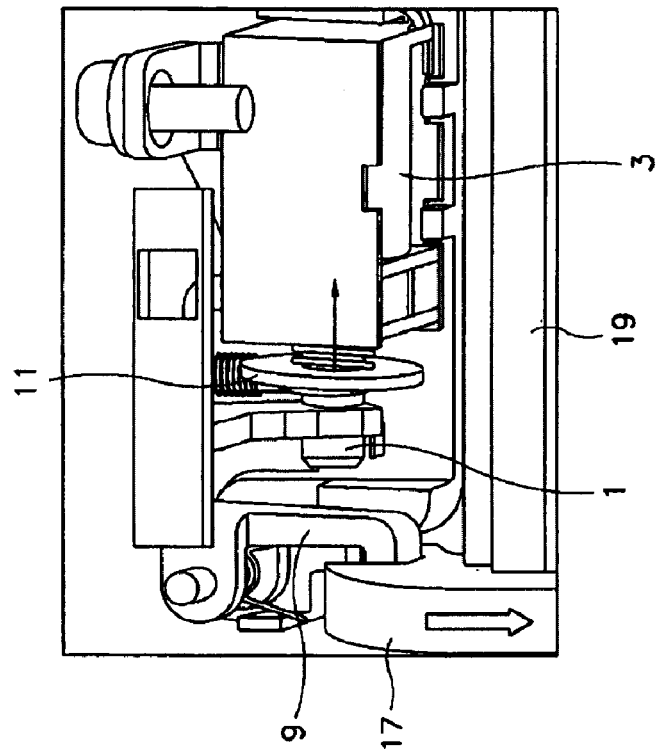

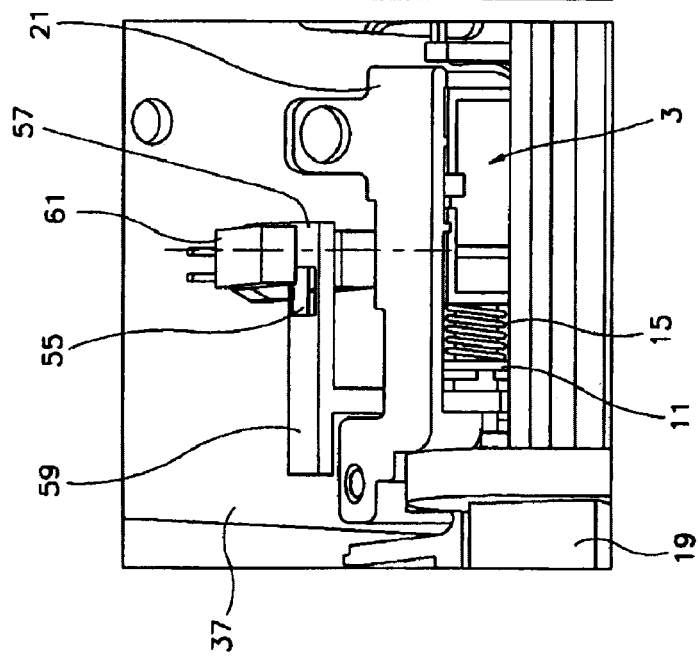

STEERING COLUMN LOCK FOR PERSONAL IDENTIFICATION CARD SYSTEM

CROSS-REFERENCE TO RELATED APPLICATIONS

The present application is based on, and claims priority to, Korean Application Serial Number 10-2004-0078386, filed on Oct. 1, 2004, the disclosure of which is hereby incorporated by reference herein in its entirety.

FIELD

The present invention relates to a steering column lock for a Personal Identification Card (PIC) system.

BACKGROUND

Generally, a Personal Identification Card (PIC) system automatically releases a locked state of a vehicle when a user having an ID card approaches his or her vehicle and touches an outdoor handle. After entering the vehicle, the user can turn on the ignition of the engine by turning a knob formed at a steering column lock in the keyless PIC system vehicle.

The steering column lock used in the above PIC system is controlled by a controller that generates a control signal according to the proximity state of the ID card to the vehicle. The steering column lock includes an electromechanical mechanism, which automatically locks or releases the knob and the steering column.

SUMMARY OF THE INVENTION

Embodiments of the present invention are provided to stably execute a switching function of locking or releasing a knob and key interlock function and the like by receiving a control signal from a controller and a knob manipulation force from the user.

A steering column lock for a personal identification card system includes a bi-directional solenoid actuator that linearly shifts a plunger, which is protruded at a lateral side of the bi-directional solenoid actuator, to and from the bi-directional solenoid actuator. A lever includes a blocking part and a pivot axis, which is perpendicular to the linear movement direction of the plunger. The lever is resiliently supported to depress the plunger into a coil part of the bi-directional solenoid actuator by contacting a protruded end of the plunger. An actuating plate is integrally installed around the plunger. A permanent magnet is mounted between the actuating plate and coil part of the bi-directional solenoid actuator to provide a magnetic force to the actuating plate. A coil spring resiliently supports the actuating plate to distance the actuating plate from the permanent magnet. A cam shaft has a pivot axis, which is perpendicular to the pivot axis of the lever. The cam shaft also includes a cam of which pivot state is converted according to the pivot state of the blocking part of the lever.

For a better understanding of the nature and objects of the present invention, reference should be made to the following detailed description with the accompanying drawings, in which.

Figure 3A:
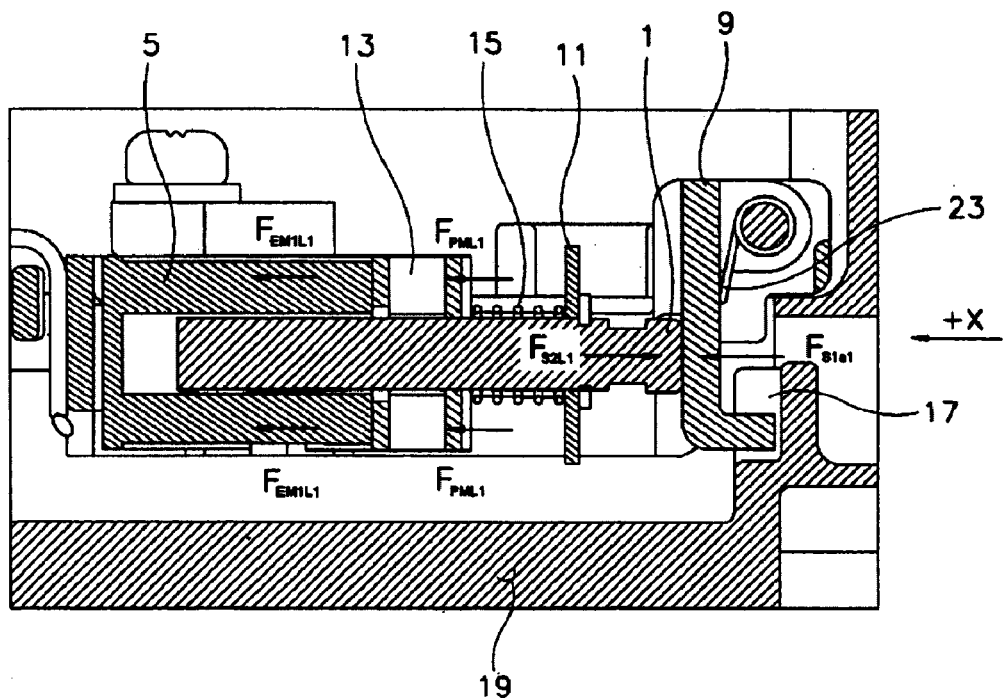
Figure 3B:
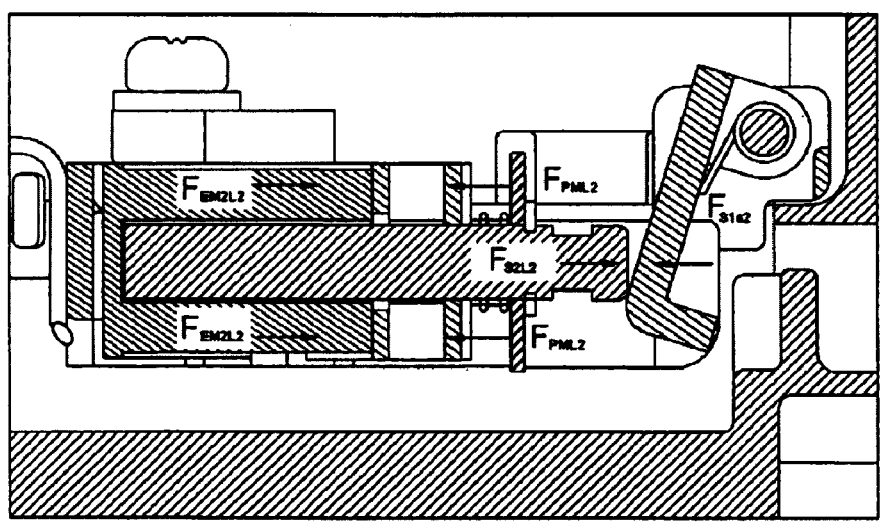
Figure 7A:
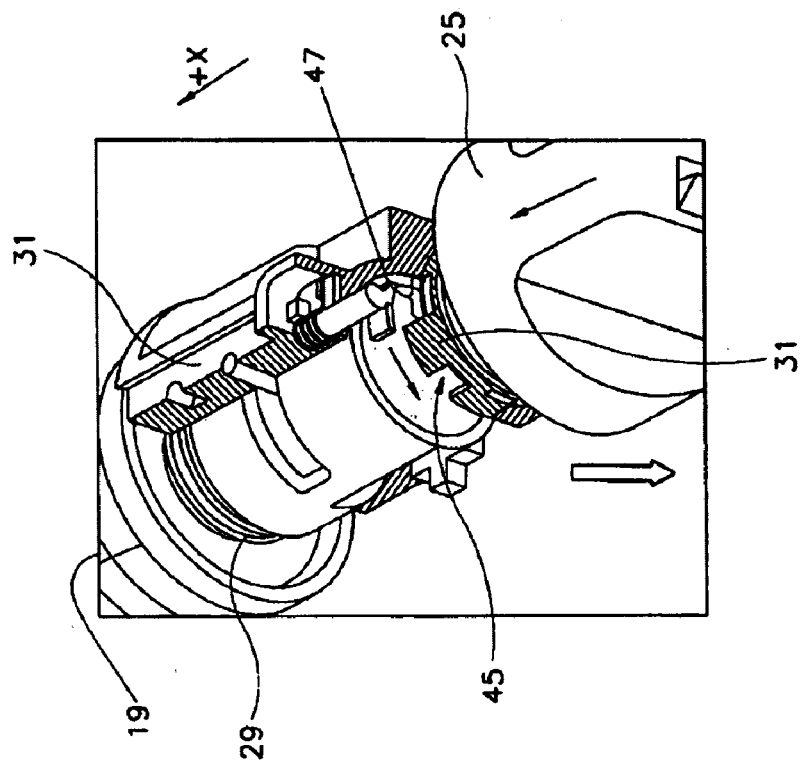
Figure 7B:
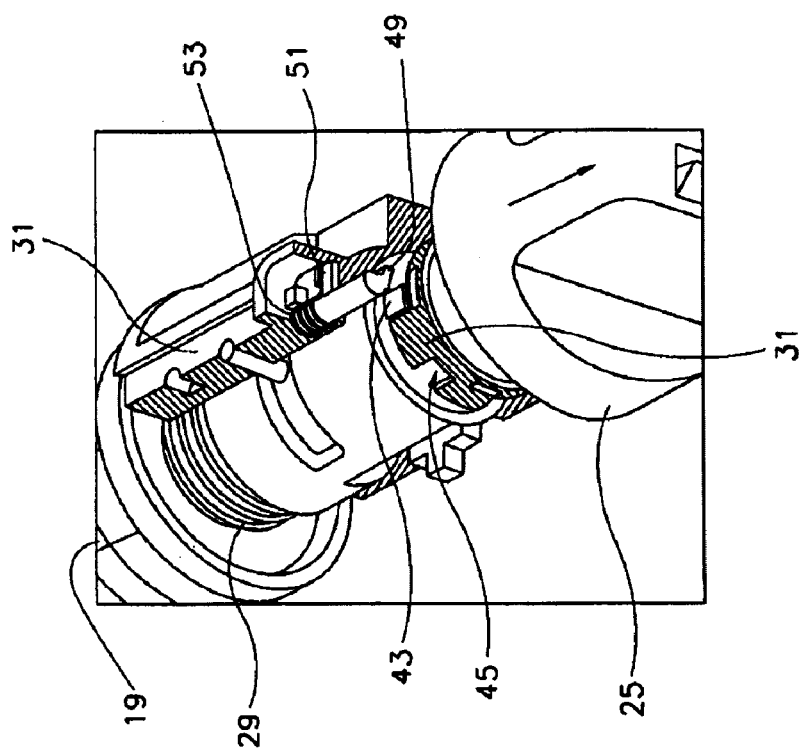
Figure 9B:
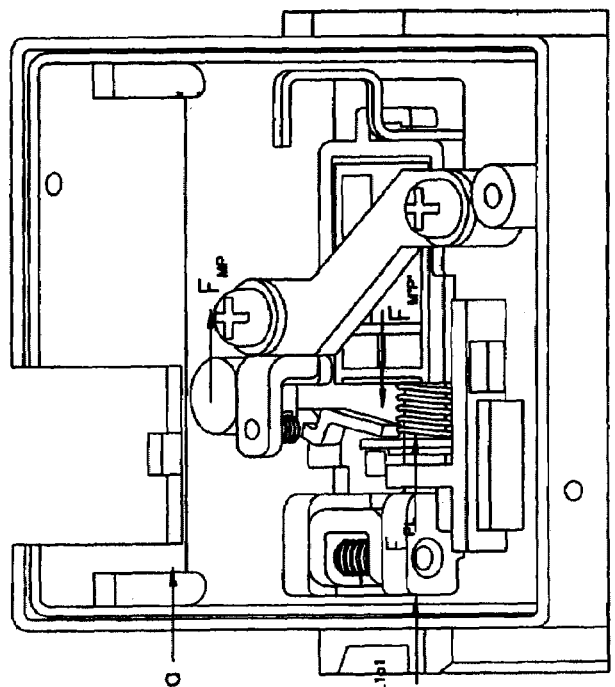
Figure 9A:
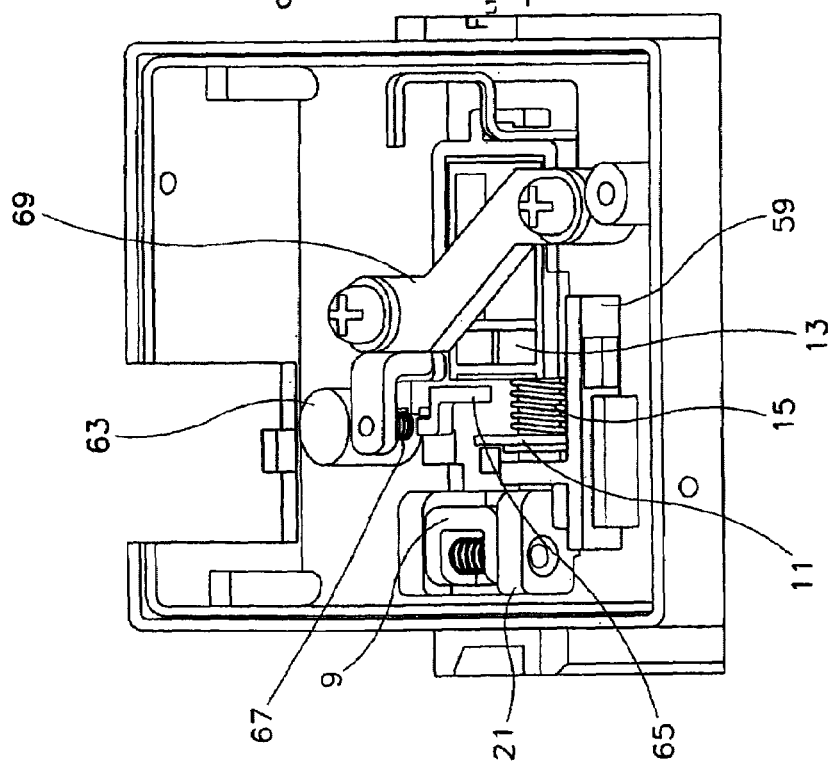

FIGS. 3A and 3B comparatively delineates operation states of a plunger and lever;

FIGS. 4A and 4B illustrate a LOCK state conversion mechanism via a cam and lever;

FIGS. 5A and 5B depict a key interlock function;

FIGS. 6A and 6B illustrate a mechanism to cope with an abnormal torque of a knob without re-operating a bi-directional solenoid actuator;

FIGS. 7A and 7B illustrate a mechanism that can be converted into a LOCK state by pressing a knob only in an ACC state once the knob is in an ON or START state;

FIGS. 8A and 8B illustrate a mechanism that detects whether a bi-directional solenoid actuator is normally operating; and FIGS. 9A and 9B illustrate a mechanism reinforced with a theft prevention function.

DETAILED DESCRIPTION OF THE EMBODIMENTS

Referring now to FIGS. 1 to 4B, an embodiment of the present invention includes a bi-directional solenoid actuator 3 that linearly shifts a plunger 1, which is protruded at a lateral side of bi-directional solenoid actuator 3. A lever 9 has a blocking part 7 and a pivot axis, which is perpendicular to the linear movement direction of plunger 1. Lever 9 is resiliently supported to depress plunger 1 into a coil part 5 of bi-directional solenoid actuator 3 by contacting a protruded end of plunger 1. An actuating plate 11 is integrally installed around plunger 1. A permanent magnet 13 is installed between actuating plate 11 and coil part 5 of bi-directional solenoid actuator 3 to provide a magnetic force to actuating plate 11. A coil spring 15 resiliently supports actuating plate 11 to distance actuating plate 11 from permanent magnet 13. A cam shaft 19 has a pivot axis, which is perpendicular to the pivot axis of lever 9. Cam shaft 19 also includes a cam 17 of which pivot state is converted according to the pivot state of blocking part 7 of lever 9.

Figure 1:
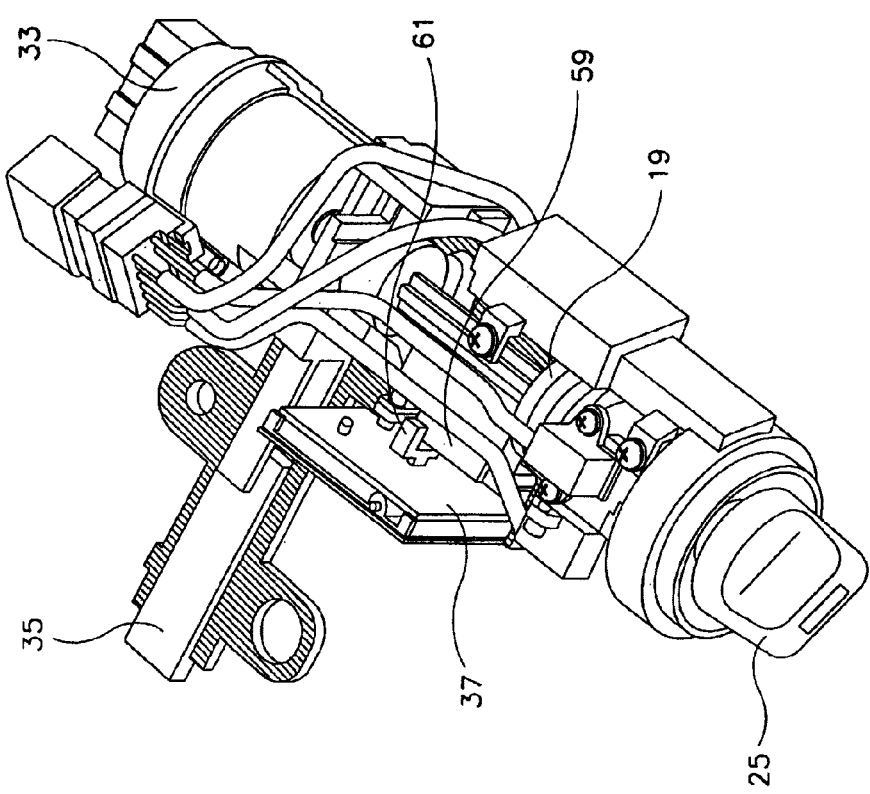
FIG. 1 is a schematic view of a steering column lock for a Personal Identification Card (PIC) system without a bi-directional solenoid actuator and the like, according to an embodiment of the present invention.
Figure 2:
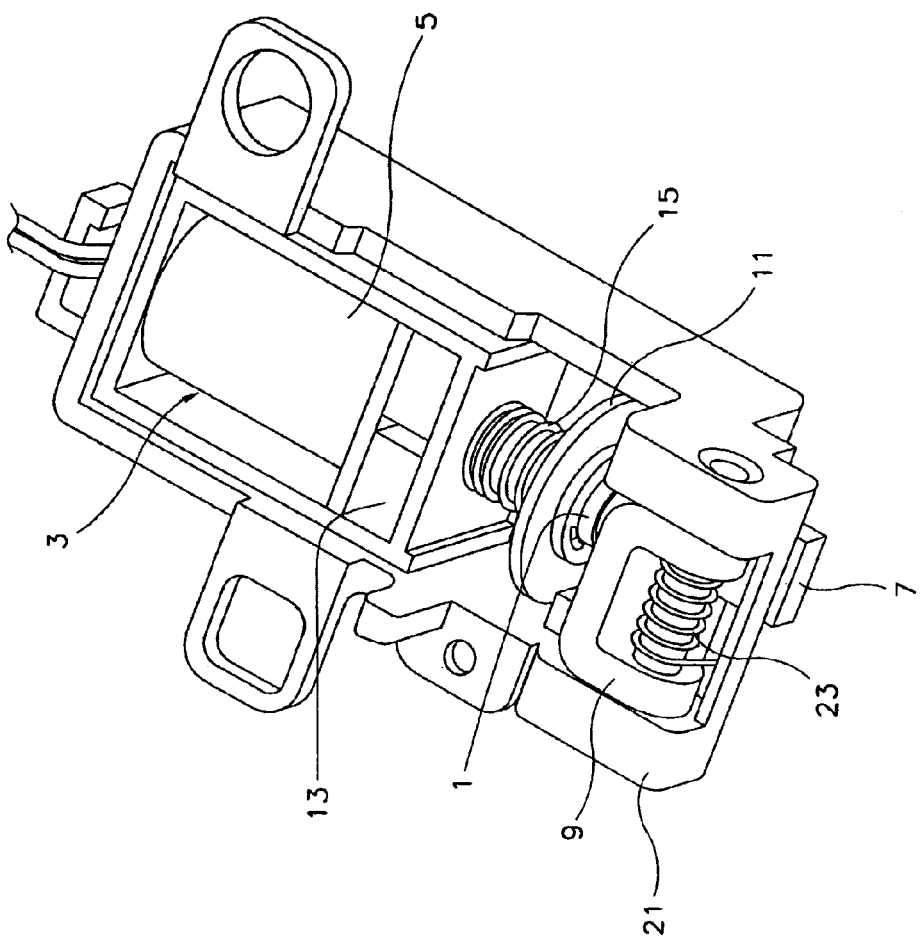
FIG. 2 illustrates an assembled state of a bi-directional solenoid actuator, permanent magnet and lever, which are removed in FIG. 1, in a base housing.

Bi-directional solenoid actuator 3, permanent magnet 13, and lever 9 are assembled in a base housing 21 as illustrated in FIG. 2. Lever 9 is resiliently supported via a torsion spring 23 installed between base housing 21 and lever 9.

With reference to FIGS. 7A and 7B, a knob 25 is provided to receive a pivot manipulation force of the user. A cylinder 27 is installed between knob 25 and cam shaft 19 for transmitting the pivot force of knob 25 to cam shaft 19. A cylinder spring 29 is inserted between cylinder 27 and cam shaft 19. Cylinder spring 29 resiliently supports cylinder 27 and cam shaft 19 by pushing cylinder 27 and cam shaft 19 away from each other. A cylinder housing 31 encloses the outer circumference of cylinder 27 and guides a linear and pivot movement of cylinder 27.

Cam shaft 19 is connected to an electrical switch part 33 to embody electrical states of Accessory (ACC), ON, and START according to the pivot state of cam shaft 19. During the ACC state, power is provided to the accessory of the vehicle. The ON state maintains the activation of the engine and allows normal operation of the vehicle. The engine is cranked in the START state.

A LOCK state immobilizes the vehicle operation by preventing the pivot of knob 25. Knob 25 according to the embodiment of the present invention can be converted from the LOCK state to the ACC state, ON state or START state by pivoting along the clockwise direction just like in typical vehicles.

A locking bar 35 is linearly and slidably installed for locking and unlocking a steering column by moving back and forth according to the pivot state of cam shaft 19. A solenoid controller 37 controls bi-directional solenoid actuator 3 by receiving an encoded control signal from a controller (not shown) in response to the access state of the ID card to the vehicle.

Cam 17 is formed with a cam lock groove 39 into which blocking part 7 of lever 9 is inserted to form a LOCK state by restraining the pivot of cam shaft 19. A cam operating groove 41 is formed on a trajectory of a circle formed by the rotation of cam lock groove 39 in relation to a central axis of cam shaft 19. Cam operating groove 41 is formed to accommodate pivot displacements of ACC, ON and START states even if blocking part 7 of lever 9 is inserted into cam operating groove 41.

Referring back to FIGS. 7A and 7B, a cylinder nose 43 protrudes out from the circumferential surface of cylinder 27 in a radial direction of cylinder 27. A cylinder lock groove 45 is opened towards cam shaft 19 at an inner side of cylinder housing 31 to form a LOCK state for insertion of cylinder nose 43. A cylinder operating groove 47 is formed on a trajectory of a circle formed by the rotation of cylinder lock groove 45 in relation to a central axis of cylinder 27. Cylinder operating groove 47 is formed in cylinder housing 31 to accommodate pivot displacements of cylinder nose 43 from the ACC state to ON state or START state even if cylinder nose 43 is inserted into cylinder operating groove 47. A blocking lever 51 is installed at cylinder housing 31 and integrally equipped with a uni-directional blocking part 49 disposed between the ACC and ON states of cylinder operating groove 47 among trajectories of circles on which cylinder nose 43 can be pivoted while cylinder 27 is pushed down towards cam shaft 19 via knob 25. Blocking lever 51 allows cylinder nose 43 to pivot only from ACC state to ON state in one direction. A blocking lever spring 53 resiliently supports blocking lever 51.

Hereinafter, the expression "+X direction" refers to a direction of knob 25 being pushed towards cam shaft 19, and "−X direction" refers to the opposite direction thereof.

As illustrated in FIGS. 8A and 8B, an optical lever 59 is integrally connected to plunger 1 and is formed with a light penetrating part 55 and a light insulating part 57. Light penetrating part 55 allows light to be penetrated in a perpendicular direction to the linear movement direction of plunger 1, and light insulating part 57 insulates penetration of the light. An optical sensor 61 detects the variation of the light penetration state according to the linear movement of light penetrating part 55 and light insulating part 57.

Optical sensor 61 is preferably installed at solenoid controller 37 as illustrated in the drawing. If actuating plate 11 is shifted to the −X direction, the light emitting from optical sensor 61 penetrates light penetrating part 55, and if actuating plate 11 is shifted to the +X direction, light insulating part 57 isolates the light in the embodiment of the present invention.

Referring next to FIGS. 9A and 9B, an impact lever 65 is installed to have a pivot shaft, which is perpendicular to the linear movement direction of plunger 1. Pivot shaft of impact lever 65 is equipped at one end thereof with a weight 63 along a perpendicular direction to the linear movement direction of plunger 1. The other end of pivot shaft of impact lever 65 pivots within the movement range of actuating plate 11. Impact lever 65 is installed to push actuating plate 11 away from permanent magnet 13. An impact lever spring 67 resiliently supports impact lever 65 at a place where the other end of impact lever 65 is in a deviated state from the movement range of actuating plate 11 to prevent any interruption with the movement of actuating plate 11. The pivot shaft of impact lever 65 is supported at one end thereof by base housing 21 and at the other end by a fixing bracket 69 (see FIGS. 9A and 9B).

The operation of the embodiment of the present invention thus constructed will now be described in detail.

Two operation states of plunger 1 and lever 9 are comparatively delineated in FIGS. 3A and 3B. In the upper drawing, cam 17 of cam shaft 19 and lever 9 may be interrupted with each other. If lever 9 is inserted into cam lock groove 39, cam 17 cannot rotate in any direction and a LOCK state is formed. If lever 9 is inserted into cam operating groove 41, cam 17 can pivot only between the ACC and START states. In the lower drawing, cam 17 can rotate in any direction without being affected by lever 9.

The upper state of FIG. 3A is maintained when Force ($F_{EM1L1}$) from coil part 5 of bi-directional solenoid actuator 3 is not provided. Force ($F_{S2L1}$) of coil spring 15 is more powerful than the resultant force of Force ($F_{S1a1}$) of torsion spring 23 and Force ($F_{PML1}$) applied to actuating plate 11 via permanent magnet 13. Plunger 1 receives force towards the −X direction. If Force ($F_{EM1L1}$) is applied to coil part 5, plunger 1 overcomes Force ($F_{S2L1}$) of coil spring 15 and shifts toward the +X direction to form the lower state of FIG. 3B.

The lower state of FIG. 3B is constantly maintained when Force ($F_{EML2L2}$) from coil part 5 is not applied. Force ($F_{S2L2}$) of coil spring 15 is more powerful than the resultant force of Force ($F_{s1a2}$) of torsion spring 23 and Force ($F_{PML2}$) applied to actuating plate 11 via permanent magnet 13. Plunge 1 receives force towards the +X direction. If Force ($F_{EM2L2}$) is applied to coil part 5, plunger 1 overcomes Force ($F_{s1a2}$) of torsion spring 23 as well as Force ($F_{PML2}$) of permanent magnet 13 and shifts toward the −X direction to form the upper state of the drawing.

Plunger 1 is converted into the upper or lower state of FIGS. 3A and 3B depending on the force applied to coil part 5 of bi-directional solenoid actuator 3. The converted state of plunger 1 is maintained until an opposite force to the previous operation via coil part 5 is applied.

In reference to FIGS. 4A and 4B, once blocking part 7 of lever 9 is inserted into cam lock groove 39 of cam 17, cam shaft 19 cannot pivot in any direction. A LOCK state of the vehicle is formed in the left drawing and knob 25 connected to cam shaft 19 via cylinder 27 is prevented from being pivoted.

Provided that a controller transmits an encoded signal to solenoid controller 37 after verifying a ride of the driver, solenoid controller 37 shifts plunger 1 toward the +X direction by manipulating coil part 5. The right state of FIG. 4 is formed and the LOCK state is released, allowing cam 17 to rotate.

When the vehicle has come to a halt and the user has finished driving, if the user turns knob 25 from ACC state back to the LOCK state, solenoid controller 37 shifts plunger 1 toward the −X direction by receiving a signal from the controller. Blocking part 7 of lever 9 is inserted into cam lock groove 39, thereby preventing knob 25 from pivoting.

FIG. 5A illustrates cam 17 in an ACC state. If knob 25 is pivoted from the right state of FIG. 4 to one of ACC, ON or START state by a user and a shift lever is shifted to any range except for PARK, the controller shifts plunger 1 toward the −X direction through solenoid controller 37, and blocking part 7 of lever 9 is inserted into cam operating groove 41. Knob 25 can now be pivoted by the driver between the ACC state and START state but restrained in pivot to the LOCK state, thereby embodying a key interlock function.

In order to turn knob 25 to the LOCK state from the above state, the shift lever should be in the PARK range. If the driver shifts the shift lever to PARK from the left state of FIG. 5A, the controller controls solenoid controller 37 to move plunger 1 to the +X direction such that lever 9 is converted as illustrated in the right state of FIG. 5B, and cam 17 can pivot into the LOCK state.

FIGS. 6A and 6B depict a mechanism to cope against a potential abnormal torque occurrence when releasing the LOCK state of knob 25 or a key interlock function. When the manipulation of knob 25 by the driver is executed before solenoid controller 37 controls plunger 1 to move toward the +X direction by receiving an encoded signal from the controller, lever 9 does not pivot normally by the force of torsion spring 23 and only plunger 1 moves toward the +X direction due to an engagement of blocking part 7 and cam 17 (see left drawing in FIG. 6A).

When knob 25 is not pivoted to a desired direction in the above case, if the driver re-pivots knob 25 after a certain period of time, lever 9 pivots at the above certain delay moment by the force of torsion spring 23 (just like the right state of FIG. 6B), then the driver can perform a desired manipulation. A simplified control logic is performed in the above state without re-activating bi-directional solenoid actuator 3 in the present invention.

After knob 25 is pivoted into the ON or START state, knob 25 can be converted from ACC state to LOCK state only when knob 25 is pushed toward the +X direction (see FIGS. 7A and 7B), thereby improving stability of the vehicle and fulfilling the vehicle safety rules.

While knob 25 is being pushed under the ACC state (right state of FIG. 7A), knob 25 can be turned in either the counterclockwise direction to the LOCK state or the clockwise direction to the ON or START state as blocking lever 51 can pivot in the counterclockwise direction.

Blocking lever 51 cannot pivot in the clockwise direction. Therefore, the ON state cannot be converted into the ACC state while knob 25 is being pushed. Thus, the driver can pivot knob 25 from the ON state to ACC state only if knob 25 is not pressed. In short, knob 25 can be converted into the LOCK state only after passing through the left state of FIG. 7.

In order to pivot knob 25 into the LOCK state from the left ACC state of FIG. 7A, knob 25 should be re-pressed and turned in the counterclockwise direction.

Once knob 25 is either in the ON or START state, the driver should pivot knob 25 in the counterclockwise direction for conversion into the ACC state. Then, knob 25 should be pressed and pivoted further in the counterclockwise direction to be converted into the LOCK state.

In case the key interlock function is not performed due to an abnormal operation of bi-directional solenoid actuator 3 with electrical or electronical problems, the driver can turn knob 25 to the LOCK state by pressing knob 25 toward the +X direction in the ACC state irregardless of the shift lever being shifted to PARK. Hence, vehicle stability is obtained and rules for vehicle safety are satisfied.

While driving at a high speed with a shift lever in the range of DRIVE, knob 25 can be converted into the LOCK state only by pushing knob 25 at the ACC state. This ensures the driver's intention to lock the steering column.

In FIGS. 8A and 8B, whether bi-directional solenoid actuator 3 is precisely controlled in accordance with the control intention is checked by monitoring the disposition of plunger 1 via optical lever 59 and optical sensor 61, thereby improving the reliability of the operation of the steering column lock.

In the left drawing of FIG. 8A, plunger 1 is maximally shifted to the −X direction such that blocking part 7 of lever 9 can restrain the pivot movement of cam 17. Light insulating part 57 of optical lever 59 that integrally moves with plunger 1 is detected via optical sensor 61. In the right drawing, plunger 1 shifts to the +X direction so that blocking part 7 of lever 9 allows the rotation of cam 17. Light penetrating part 55 of optical lever 59 integrally moving with plunger 1 is detected via optical sensor 61.

Controller or solenoid controller 37 checks whether bi-directional solenoid actuator 3 is controlled as desired via a signal from optical sensor 61, and then re-operates bi-directional solenoid actuator 3 if necessary, thereby greatly improving the reliability of the operation of the steering column lock.

The left state in FIG. 9A illustrates a normal LOCK state of the steering column lock, and the right state thereof illustrates when external impact is applied.

Weight 63 of impact lever 65 receives force towards the +X direction as plunger 1 tends to move towards +X direction by the external impact. Impact lever 65 pivots in the clockwise direction and pushes actuating plate 11 to the −X direction, resulting in a restraint of plunger 1 from moving towards the +X direction.

When acceleration (a) through the external impact is applied to the steering column lock, Force ($F_{M'P'}$) applied to actuating plate 11 as impact lever 65 pivots by Force ($F_{MP}$) applied to weight 63 should be greater than the resultant force of Force ($F_{L1a1}$) of torsion spring 23 as well as Force (FPL) of plunger 1 received by the acceleration (a). Therefore, sufficient mass for weight 63 should be formed. Plunger 1 is restrained from moving upon exterior impact, thereby reinforcing a theft prevention function.

As apparent from the foregoing, there is an advantage in that a LOCK state conversion of the knob and a key interlock function are performed by one bi-directional solenoid actuator conventionally requiring two solenoid actuators, thereby reducing the number of components, weight, volume of the vehicle and manufacturing costs. The control logic of the controller or solenoid controller is also simplified.

The bi-directional solenoid actuator of the present invention has two static dispositions and completes its operation by using a short electrical pulse while the plunger is in operation, and the coil part of the bi-directional solenoid actuator is not required to be operated for a long period of time, thereby increasing the durability of the bi-directional solenoid actuator. A plunger having a relatively light weight is used in the embodiment of the present invention, reducing the operation noise.

The bi-directional solenoid actuator activated only by a short electrical pulse is prevented from a premature discharge of the battery. Even if the shift lever is in the PARK range for a long period of time with the knob in the ACC state, the key interlock function is completely embodied by single pulse applied to the bi-directional solenoid actuator, thus preventing a continuous battery discharge.

Further, even if the lever is abnormally restricted in movement due to the pivot manipulation of the driver applied before the operation of the plunger, the lever can normally operate without re-activating the bi-directional solenoid actuator by the separate configuration of the plunger and lever and by the certain delay period of time of the pivot manipulation of the driver.

Furthermore, in case the key interlock function is not properly executed by an abnormal operation of the bi-directional solenoid actuator due to electrical or electronical problems, the knob should be pressed in the ACC state to be converted into the LOCK state, thereby improving the stability of the vehicle and carrying out the vehicle safety rules.

What is claimed is:

1. A steering column lock for a personal identification card system, comprising:
   a bi-directional solenoid actuator that linearly shifts a plunger, which is protruded at a lateral side of said bi-directional solenoid actuator;
   a lever including a blocking part and a pivot axis, which is perpendicular to a linear movement direction of said plunger, said lever being resiliently supported to depress said plunger into a coil part of said bi-directional solenoid actuator by contacting a protruded end of said plunger;
   an actuating plate integrally installed around said plunger;
   a permanent magnet mounted between said actuating plate and said coil part of said bi-directional solenoid actuator to provide a magnetic force to said actuating plate;
   a coil spring that resiliently supports said actuating plate to distance said actuating plate from said permanent magnet; and
   a cam shaft having a pivot axis, which is perpendicular to said pivot axis of said lever, said cam shaft including a cam whose pivot state is converted according to a pivot state of said blocking part of said lever.

2. The steering column lock as defined in claim 1, wherein said cam comprises:
   a cam lock groove into which said blocking part of said lever is inserted to form a LOCK state by restraining a pivot of said cam shaft; and
   a cam operating groove that is formed on a trajectory of a circle formed by a rotation of said cam lock groove in relation to a central axis of said cam shaft, said cam operating groove being formed to accommodate pivot displacements of ACC, ON and START states even if said blocking part of said lever is inserted into said cam operating groove.

3. The steering column lock as defined in claim 2, further comprising:
   a knob receiving a pivot manipulation force of a user;
   a cylinder installed between said knob and said cam shaft for transmitting a pivot force of said knob to said cam shaft;
   a cylinder spring inserted between said cylinder and said cam shaft, said cylinder spring resiliently supporting said cylinder and said cam shaft by pushing said cylinder and said cam shaft away from each other; and
   a cylinder housing that encloses an outer circumference of said cylinder and guides a linear and pivot movement of said cylinder.

4. The steering column lock as defined in claim 3, further comprising:
   a cylinder nose protruding out from a circumferential surface of said cylinder in a radial direction of said cylinder;
   a cylinder lock groove opened towards said cam shaft at an inner side of said cylinder housing to form a LOCK state for insertion of said cylinder nose;
   a cylinder operating groove that is formed on a trajectory of a circle formed by a rotation of said cylinder lock groove in relation to a central axis of said cylinder, said cylinder operating groove being formed in said cylinder housing to accommodate pivot displacements of said cylinder nose from the ACC state to ON state or START state even if said cylinder nose is inserted into said cylinder operating groove;
   a blocking lever installed at said cylinder housing and integrally equipped with a uni-directional blocking part that is disposed between the ACC and ON states of said cylinder operating groove among trajectory of circle on which said cylinder nose can be pivoted while said cylinder is pushed down towards said cam shaft via said knob, said blocking lever allowing said cylinder nose to pivot only from ACC state to ON state in one direction; and
   a blocking lever spring resiliently supporting said blocking lever.

5. The steering column lock as defined in claim 1, further comprising:
   an optical lever integrally connected to said plunger, said optical lever being formed with a light penetrating part, which allows light to be penetrated in a perpendicular direction to a linear movement direction of said plunger, and a light insulating part that insulates penetration of the light; and
   an optical sensor for detecting a variation of the light penetration state according to a linear movement of said light penetrating part and said light insulating part.

6. The steering column lock as defined in claim 1, further comprising:
   an impact lever installed to have a pivot shaft, which is perpendicular to a linear movement direction of said plunger, said pivot shaft of said impact lever being equipped at one end thereof with a weight along a perpendicular direction to the linear movement direction of said plunger, the other end of said pivot shaft of said impact lever pivoting within a movement range of said actuating plate, said impact lever being installed to push said actuating plate away from said permanent magnet; and
   an impact lever spring supporting said impact lever at a place where the other end of said impact lever is in a deviated state from the movement range of said actuating plate to prevent any interruption with the movement of said actuating plate.

* * * * *

UNITED STATES PATENT AND TRADEMARK OFFICE
CERTIFICATE OF CORRECTION

| | | |
|---|---|---|
| PATENT NO. | : 7,009,479 B1 | Page 1 of 1 |
| APPLICATION NO. | : 11/024886 | |
| DATED | : March 7, 2006 | |
| INVENTOR(S) | : Jin-Sang Chung and Sung-Ook Choi | |

It is certified that error appears in the above-identified patent and that said Letters Patent is hereby corrected as shown below:

On the Title page:

Item (73)

"Hyundai Motor Company, Seoul (KR)"
should be changed to

--Hyundai Motor Company, Seoul (KR);
Huf Hülsbeck & Fürst GmbH & Co., Velbert (DE)--.

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,009,479 B1 | Page 1 of 1 |
| APPLICATION NO. | : 11/024866 | |
| DATED | : March 7, 2006 | |
| INVENTOR(S) | : Jin-Sang Chung and Sung-Ook Choi | |

It is certified that error appears in the above-identified patent and that said Letters Patent is hereby corrected as shown below:

On the Title page:

Item (73)

"Hyundai Motor Company, Seoul (KR)"
should be changed to

--Hyundai Motor Company, Seoul (KR);
Huf Hülsbeck & Fürst GmbH & Co., Velbert (DE)--.

This certificate supersedes Certificate of Correction issued November 21, 2006.

Signed and Sealed this

Second Day of January, 2007

JON W. DUDAS
*Director of the United States Patent and Trademark Office*